US012732403B2

(12) United States Patent
Memisoglu et al.

(10) Patent No.: US 12,732,403 B2
(45) Date of Patent: Sep. 8, 2026

(54) PAIRING MODULATION

(71) Applicant: Vestel Elektronik Sanayi ve Ticaret A. S., Manisa (TR)

(72) Inventors: Ebubekir Memisoglu, Istanbul (TR); Mehmet Ali Aygül, Manisa (TR); Hüseyin Arslan, Istanbul (TR)

(73) Assignee: Vestel Elektronik Sanayi ve Ticaret A. S., Manisa (TR)

( * ) Notice: Subject to any disclaimer, the term of this patent is extended or adjusted under 35 U.S.C. 154(b) by 19 days.

(21) Appl. No.: 18/846,724

(22) PCT Filed: Mar. 14, 2022

(86) PCT No.: PCT/EP2022/056506
§ 371 (c)(1),
(2) Date: Sep. 13, 2024

(87) PCT Pub. No.: WO2023/174505
PCT Pub. Date: Sep. 21, 2023

(65) Prior Publication Data

US 2025/0202742 A1 Jun. 19, 2025

(51) Int. Cl.
*H04L 27/04* (2006.01)
*H04L 27/06* (2006.01)
*H04L 27/36* (2006.01)
*H04L 27/38* (2006.01)

(52) U.S. Cl.
CPC .............. *H04L 27/04* (2013.01); *H04L 27/06* (2013.01); *H04L 27/36* (2013.01); *H04L 27/38* (2013.01)

(58) Field of Classification Search
CPC ......... H04L 27/04; H04L 27/06; H04L 27/36; H04L 27/38; H04L 5/001; H04L 27/22; H04L 27/2634; H04L 27/20
USPC ................................ 375/261–262, 267, 295
See application file for complete search history.

(56) References Cited

U.S. PATENT DOCUMENTS

| | | | | |
|---|---|---|---|---|
| 2005/0105629 | A1 | 5/2005 | Hottinen et al. | |
| 2006/0280229 | A1* | 12/2006 | Kim | H04B 1/707<br>375/267 |
| 2007/0237209 | A1* | 10/2007 | Rjeily | H04L 25/4902<br>375/267 |
| 2009/0060090 | A1* | 3/2009 | Ban | H04L 27/2613<br>375/329 |

(Continued)

OTHER PUBLICATIONS

Wen et al. "Enhanced Orthogonal Frequency Division Multiplexing With Index Modulation", IEEE Transactions on Wireless Communications, 2017, vol. 16:7, pp. 4786-4801.

*Primary Examiner* — Emmanuel Bayard
(74) *Attorney, Agent, or Firm* — The Webb Law Firm

(57) ABSTRACT

Methods and techniques are described for increasing the spectral efficiency in wireless transmission and reception. In particular, sequential portions of data are mapped onto respective modulation symbols according to a target modulation, whereby the modulation symbols include a first modulation symbol and a second modulation symbol. First and second combined symbols are generated, which includes obtaining a first and a second linear combination of the first and second modulation symbol, with the first linear combination being different from the second linear combination. The first and second combined symbols are mapped onto a respective first and second carrier and transmitted.

14 Claims, 10 Drawing Sheets

(56) References Cited

U.S. PATENT DOCUMENTS

| | | | | |
|---|---|---|---|---|
| 2011/0182325 | A1* | 7/2011 | Abou-Rjeily | H04L 1/0625 375/E1.001 |
| 2014/0274087 | A1* | 9/2014 | Frenne | H04L 1/0057 455/452.1 |
| 2017/0331662 | A1* | 11/2017 | Sun | H04J 11/004 |
| 2018/0220399 | A1* | 8/2018 | Davydov | H04L 1/0026 |
| 2019/0253299 | A1* | 8/2019 | Klenner | H04J 11/004 |
| 2020/0403834 | A1* | 12/2020 | Lanoiselee | H04L 27/26538 |
| 2021/0227553 | A1* | 7/2021 | Zhang | H04L 1/001 |
| 2023/0170949 | A1* | 6/2023 | Namgoong | H04L 1/0625 375/267 |

* cited by examiner

Communication System CS
Transmitter Tx
Interface IF
Receiver Rx

Memory 251
Processing circuitry 252
Wireless transceiver 253
User interface 254
255
250

Memory 261
Processing circuitry 262
Wireless transceiver 263
User interface 264
265
260

$x_1 + x_2$

| Bits ( $x_1, x_2$ ) | Symbols ( $x_1+x_2$ , $x_1-x_2$ ) |
|---|---|
| (0, 0) | ( $-\sqrt{2}$, 0) |
| (0, 1) | (0, $-\sqrt{2}$) |
| (1, 1) | ($\sqrt{2}$, 0) |
| (1, 0) | (0, $\sqrt{2}$) |

Pairing modulation

| Bits (index bit, symbol bit) | Symbols (1. carrier, 2. carrier) |
|---|---|
| (0, 0) | ( $-\sqrt{2}$, 0) |
| (0, 1) | ($\sqrt{2}$, 0) |
| (1, 1) | (0, $\sqrt{2}$) |
| (1, 0) | (0, $-\sqrt{2}$) |

Index modulation

FIG. 7

PAIRING MODULATION

CROSS-REFERENCE TO RELATED APPLICATION

This application is the United States national phase of International Application No. PCT/EP2022/056506 filed Mar. 14, 2022, the disclosure of which is hereby incorporated by reference in its entirety.

BACKGROUND

Technical Field

The present disclosure relates generally to communication, and, in some particular embodiments, to techniques for symbol modulation in communication systems and transmission and reception of modulated symbols.

Technical Considerations

Wireless communication has been advancing over several decades now. Global communication systems as well as local network systems have been recently using technology based on Orthogonal Frequency Division Multiplexing (OFDM).

In OFDM, data symbols are simultaneously transmitted over a plurality of subcarriers. Data symbol here refers to a modulation symbol which may carry one or more data bits, depending on a modulation order. Simultaneously means within one OFDM symbol. An OFDM symbol is obtained by mapping the modulation symbols onto subcarriers of the transmission band and by then transforming the subcarriers by an inverse Fourier transformation (IFFT), or in general by an inverse orthogonal transformation. The OFDM symbol—now in time domain—is then provided for transmission. Before the transmission, still further operations may be used, such as operations in connection with multiple input multiple output (MIMO) processing or some further signal processing. The transmission may further include one or more of pulse shaping, amplification, and modulation onto the appropriate carrier frequency.

A total N $\log_2 M$ number of bits can be transmitted for each OFDM symbol, where N and M are the number of subcarriers in a resource unit (RU) and the modulation order, respectively. Resource unit is a unit of allocable resources. For example, a minimum allocable resource unit may include a plurality of subcarriers in one or more OFDM symbols (corresponding to intervals in time domain). Here, the spectral efficiency of an OFDM system can be given as $\log_2 M$. In IEEE (Institute of electrical and electronics engineers) 802.11 (Wi-Fi) standards, for example in IEEE 802.11ax (Wi-Fi 6), different modulation and coding schemes (MCSs) are defined with varying modulation order and coding rate. For example, MCSO is a scheme with binary phase shift keying (BPSK) (M=2) and 1/2 coding rate. In MCSO, only $\log_2 M=1$ bit can be transmitted per subcarrier. Hence, this scheme may be used when the channel conditions are bad or the received signal strength is low. However, this comes at the expense of low data throughput.

An important concept for high-throughput of data in wireless communication is multiple-input multiple-output (MIMO). In the literature, there are three main different MIMO concepts: (1) spatial multiplexing, (2) space-time block coding, and (3) spatial modulation. In spatial multiplexing, the signal is transmitted from multiple antennas with the proper phase adjustments to provide orthogonal spatial streams. Also, this adjustment is called precoding, where it is designed based on channel information, often referred to as channel state information (CSI). Therefore, spatial multiplexing aims to increase the capacity of MIMO systems with special precoding mechanisms. In the space-time block coding, the symbols are coded to increase the capacity without the channel information at the transmitter. The most known space-time block coding is the Alamouti coding with full transmit diversity gain. In the spatial modulation, the information is transmitted by a special antenna configuration, so that the antennas are used as a constellation.

Inspired by spatial modulation, index modulation (IM) has been developed for the subcarriers of an OFDM system. Like using the antenna configuration to transmit the information in the spatial modulation, the index modulation configures the subcarriers as active and passive. In this way, it achieves a better spectral efficiency in a high signal-to-noise ratio, SNR, region, especially for low-order modulation schemes, such as BPSK and QPSK. For the index modulation, the different look-up tables are developed for better spectral efficiency. To enhance the OFDM-IM performance, many different techniques have been developed. Among these techniques, multi-mode OFDM-IM (MM-OFDM-IM) tries to increase the spectral efficiency by using different constellations without removing any passive subcarriers. To optimize the performance of MM-OFDM-IM, different constellation designs have been developed for the purpose of maximizing the minimum distance between different symbols of the constellation with maintaining a gray coding mechanism.

Recently, OFDM-IM and MM-OFDM-IM has been analyzed for practical implementation, and it was concluded that the coded performance superiority of OFDM-IM and MM-OFDM-IM is narrowed down by introducing LDPC code. The results show that OFDM-IM and MM-OFDM-IM schemes only provide a better performance within a limited code rate range, usually at a high code rate. In addition, as the spectral efficiency increases, the design and log-likelihood ratio (LLR) calculation will become more difficult, with the consequence that the application of OFDM-IM-based schemes for the LDPC coded scenarios is limited. Also, index modulation-based techniques provide a worse spectral efficiency for flat and additive white Gaussian noise (AWGN) channels.

Improving the spectral efficiency and diversity order is a challenging task.

SUMMARY

Methods and techniques are described for facilitating an increase of spectral efficiency by pairing modulation symbols to form different linear combinations.

For example, a method is provided for wireless transmission of data, the method comprising: mapping sequential portions of the data onto respective modulation symbols according to a target modulation, the modulation symbols including a first modulation symbol and a second modulation symbol; generating a first combined symbol including obtaining a first linear combination of the first modulation symbol and the second modulation symbol; generating a second combined symbol including obtaining a second linear combination different from the first linear combination of the first modulation symbol and the second modulation symbol; and mapping the first combined symbol onto a first carrier and the second combined symbol onto a second carrier, different from the first carrier; and transmitting the first combined symbol and the second combined symbol.

Furthermore, a method is provided for wireless reception of data, the method comprising: receiving a first combined symbol and a second combined symbol; and determining the data from the first combined symbol and the second combined symbol, by a predefined detection method assuming that: sequential portions of the data are mapped onto respective modulation symbols according to a target modulation, the modulation symbols including a first modulation symbol and a second modulation symbol; the first combined symbol is generated including obtaining a first linear combination of the first modulation symbol and the second modulation symbol; the second modulation symbol is generated including obtaining a second linear combination different from the first linear combination of the first modulation symbol and the second modulation symbol; and the first combined symbol is mapped onto a first carrier and the second combined symbol is mapped onto a second carrier, different from the first carrier.

According to further embodiments, apparatuses are provided for transmission and reception if the signals which include processing circuitry configured to perform the steps of the respective transmitting and receiving methods mentioned above, as well as a transceiver configured to transmit or receive the signals.

The above-mentioned circuitry may be any circuitry such as processing circuitry including one or more processors and/or other circuitry elements.

These and other features and characteristics of the presently disclosed subject matter, as well as the methods of operation and functions of the related elements of structures and the combination of parts and economies of manufacture, will become more apparent upon consideration of the following disclosure herein with reference to the accompanying drawings, all of which form a part of this specification. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF DRAWINGS

An understanding of the nature and advantages of various embodiments may be realized by reference to the following figures.

FIG. 7 is illustrates the difference between bits and symbols for the paring modulation and index modulation

Like reference numbers and symbols in the various figures indicate like elements, in accordance with certain example implementations.

DESCRIPTION

Figures 1, 2A, 2B:
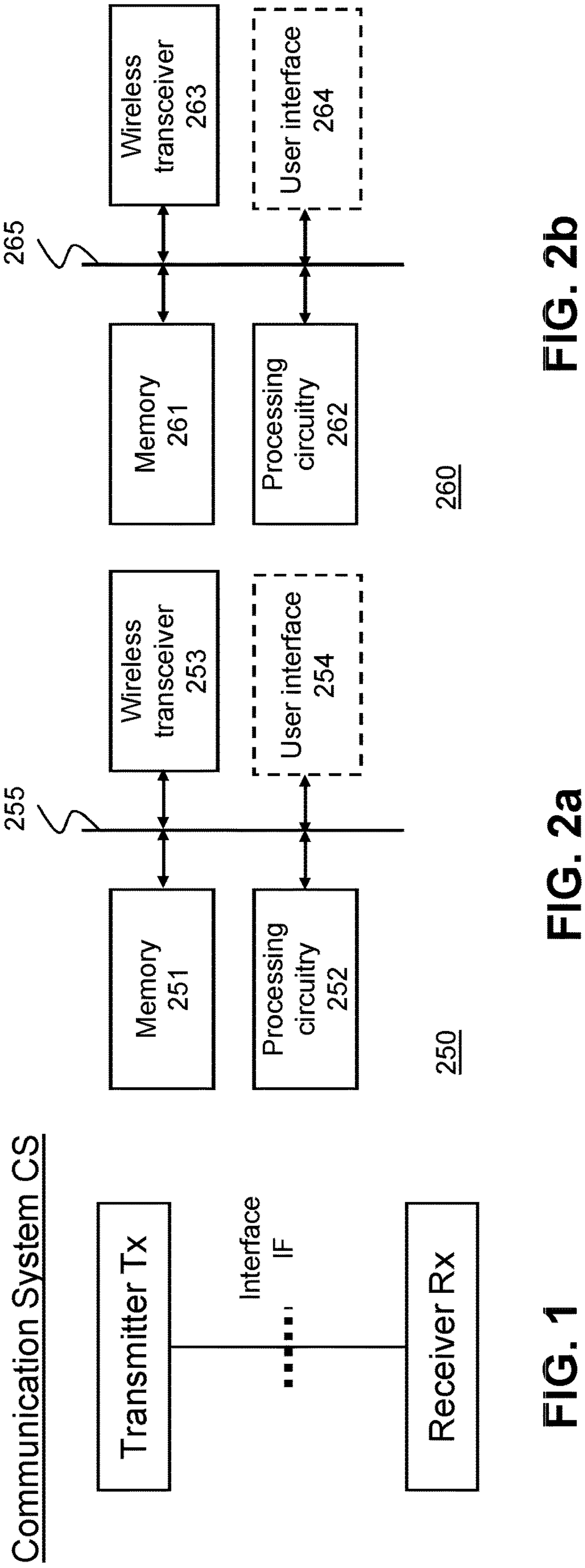
FIG. 1 is a block diagram illustrating an exemplary communication system.
FIG. 2*a* is a block diagram illustrating an exemplary transmitting device employing the pairing modulation.
FIG. 2*b* is a block diagram illustrating an exemplary receiving device employing the pairing modulation.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

FIG. 1 illustrates an exemplary communication system CS in which Tx represents a transmitter and Rx represents a receiver. The transmitter Tx is capable of transmitting a signal to the receiver Rx over an interface IF. The interface may be, for instance, a wireless interface. For example, the wireless interface may be implemented by a single antenna of transmitter Tx and/or receiver Rx. Alternatively, the wireless interface may be implemented by multiple antennas of the transmitter Tx and/or receiver Tx. The interface may be specified by means of resources, which can be used for the transmission and reception by the transmitter Tx and the receiver Rx. Such resources may be defined in one or more (or all) of the time domain, frequency domain, code domain, and space domain. It is noted that in general, the "transmitter" and "receiver" may be also both integrated in the same device. In other words, the devices Tx and Rx in FIG. 1 may respectively also include the functionality of the Rx and Tx.

The present disclosure is not limited to any particular transmitter Tx, receiver Rx and/or interface IF implementation. However, it may be applied readily to some existing communication systems as well as to the extensions of such systems, or to new communication systems. Exemplary existing communication systems may be, for instance the 5G New Radio (NR) in its current or future releases, and/or the IEEE 802.11 based systems such as the recently studied IEEE 802.11 be, and 6G technologies or the like.

As mentioned in the background section, OFDM is a popular wideband multi-carrier transmission technology and has been used in many standards such as IEEE 802.11 (Wi-Fi), LTE (Long Term Evolution, which is a mobile communication system of 4th generation, 4G), New Radio (NR, which belongs to $5^{th}$ generation, 5G). In OFDM, frequency band is divided into subbands and these bands are called subcarriers. The data symbols, which are obtained by mapping incoming bits with a constellation, are transmitted simultaneously over these subcarriers. A certain number of subcarriers forms a resource unit (RU). For example, an RU may include 26, 52, 106, 242, 484 or 996 subcarriers. In Wi-Fi standards such as IEEE 802.11ax (Wi-Fi 6), there are several MCSs which allow to adjust the data rate and communication range. For example, MCSO corresponds to BPSK with 1/2 coding rate and it provides the most reliable communication and the lowest data rate among all MCSs.

The OFDM waveform is used in many wireless standard due to its advantages over other alternative waveforms. For modulation of the OFDM waveform, quadrature amplitude modulation (QAM) is widely used for high spectral efficiency. Although the OFDM waveform and QAM modulation are widely accepted, many different waveforms and digital modulation techniques have been developed in the literature. Along with waveform design and digital modulation techniques, different strategies like index modulation-based techniques have been developed. For index modulation (IM), there are active and idle subcarriers, and index modulation determines the indices of active subcarriers in a subcarrier set, after which the determined subcarriers can be modulated with any digital modulation techniques. For the subcarrier activation pattern, different strategies have been developed to satisfy a wide variety of requirements. For further enhancement of throughput, idle subcarriers are also used for multi-mode (MM) index modulation techniques, such as MM-OFDM-IM. For these techniques, the index information bits determine the mapper to be used on a specific subcarrier among the set of multiple mappers.

Index-modulation-based techniques provide a better spectral efficiency, they may perform better than conventional OFDM systems in high SNR regions. For instance, OFDM-IM with quadrature-phase-shift-keying (QPSK) provides a better spectral efficiency than OFDM with QPSK after 15 dB SNR. However, OFDM-IM may become inefficient for practical implementation, because conventional OFDM systems provide efficient SNR intervals for each modulation order, to adaptively optimize the spectral efficiency.

Moreover, IM-based techniques only provide a better performance in a specific SNR interval for a frequency-selective channel. For next-generation communication systems, more spectral efficient techniques are required to meet high throughput requirements by increasing the spectrum efficiency.

It is noted that the present disclosure can readily be applied to OFDM systems, but is not limited thereto. It is conceivable that the present disclosure may be applied in general to other schemes such as frequency division multiplexing (FDM). The OFDM or the FDM is not limited to using FFT, but may use discrete Fourier transformation (DFT) or other transformations. At the receiver side, the time domain signal is received. Samples belonging to an OFDM symbol are transformed by a (forward) transformation such as fast Fourier transformation or the like. Thereby, modulation symbols mapped onto the subcarriers are obtained and de-mapped.

In order to increase the spectrum efficiency, a modulation method is described in the following where modulation symbols are combined by pairing, for example, two modulation symbols. Instead of transmitting the (original) modulation symbols, linearly combined modulation symbols are transmitted which are then used at the receiver side to determine (e.g., by detection) the original modulation symbols. This is referred to as pairing modulation. In the present disclosure, paring modulation refers to combining, for example, two symbols representing portions of data (e.g., a bit stream), into two combined symbols. As such, the symbols to be combined are already modulated symbols obtained by modulating the respective portions according to a target modulation (e.g., BPSK). Thereby, combining means superposing the two (modulation) symbols by a linear combination for each of the two combined symbols. The pairing modulation detailed below is not limited to linearly combining of two modulation symbols. Rather, more than two modulation symbols may be linearly combined using a suitable linear combination so as to generate a respective combined symbol. In other words, a single combined symbol represents more than two modulation symbols in this case.

In the following, apparatuses and methods are discussed, which provide functionalities of paring modulation, along with transmission and reception of the respective combined (i.e., paired) symbols.

FIG. 2*a* illustrates a transmitting device 250 according to some exemplary embodiments. The transmitting device 250 may be a part of any wireless communication device such as a station (STA) or access point (AP), or, in general base station (BS) or terminal (i.e., user equipment UE). The transmitting device 250 comprises memory 251, processing circuitry 252, and a wireless transceiver 253 (or a wireless transmitter 253), which may be capable of communicating with each other via a bus 255. The transmitting device 250 may further include a user interface 254. However, for some applications, the user interface 254 is not necessary (for instance some devices for machine-to-machine communications or the like).

The memory 251 may store a plurality of firmware or software modules, which implement some embodiments of the present disclosure. The memory 251 may be read from by the processing circuitry 252. Thereby, the processing circuitry may be configured to carry out the firmware/software implementing the embodiments. The processing circuitry 252 may include one or more processors, which, in operation, prepare data for transmission. In particular, the circuitry 252 is configured to map sequential portions of the data onto respective modulation symbols according to a target modulation. In an implementation example, the target modulation is one of phase shift keying, PSK, pulse amplitude modulation, PAM, and quadrature amplitude modulation, QAM, but may not be limited to the target modulations listed. For example, amplitude phase shift keying (ASK) or frequency shift keying (FSK) may be also used to map sequential portions of the data onto respective modulation symbols according to ASK or FSK. A further option is to combine target modulations. As such it is understood, that the above-listed target modulations also cover their respective subsets. PSK, for example, covers BPSK, DPSK, M'ary PSK, QPSK, OQPSK etc., FSK covers BFSK, M'ary FSK, MSK, GMSK etc., ASK covers on-off keying, M'ary ASK etc. QAM is commonly referred to as M'ary QAM covering rectangular QAM or circular QAM. The modulation symbols include a first modulation symbol and a second modulation symbol. In a particular exemplary implementation, BPSK or QPSK are used to generate the modulation symbols. Such lower-order modulations are robust and their application for pairing modulation may provide further improvement as discussed herein.

The circuitry 252 is further configured to generate a first combined symbol including obtaining a first linear combination of the first modulation symbol and the second modulation symbol, to generate a second combined symbol including obtaining a second linear combination different from the first linear combination of the first modulation symbol and the second modulation symbol, and to subsequently map the first combined symbol onto a first carrier and the second combined symbol onto a second carrier, different from the first carrier. The data may be a block of data such as a sequence of bits provided for transmission from a higher layer or it may be an encoded block of data. For instance, the data block may be encoded by a forward error coding of any kind.

The wireless transceiver 253 is configured to transmit the generated first combined symbol and the second combined symbol. Before passing a signal carrying the combined symbols to an analog front including a single or multiple antennas, the transceiver may perform possibly further operations. Such further operations may include an inverse transformation such as the inverse fast Fourier transform (IFFT) or inverse discrete cosine transform (IDCT), in accordance with the desired (orthogonal or non-orthogonal) frequency division multiplex. Moreover, the transformed time-domain symbols may then be modulated onto the actual carrier, amplified or the like.

In an exemplary implementation, the transmitting operation of the transceiver 253 includes further orthogonal frequency division multiplex, OFDM, modulation of the carriers including carriers carrying the first combined symbol and the second combined symbol. Alternatively, non-OFDM waveforms may be used for modulating the carriers that carry the respective combined symbols. The first and second combined symbols are transmitted using a single antenna. Alternatively, the combined symbols may be transmitted using multiple antennas.

As FIG. 2*a* shows, the memory 251 may be separated from the processing circuitry 252. However, this is only an example. In general, the memory 251 may be implemented within the processing circuitry 252, and e.g., within the one or more processors. The term "memory" refers to any type of long term, short term, volatile, nonvolatile, or other memory and is not to be limited to any particular type of memory or number of memories, or type of media upon which memory is stored.

The wireless transceiver 253 may operate according some known resource multiplexing and/or multi-user multiplexing scheme. In general, any currently used scheme such as those employed in the IEEE 802.11 framework or in the 5G/6G framework are applicable. In particular, possible examples include the OFDM, OFDMA, or non-orthogonal multiple access (NOMA) or the like.

Figure 10:
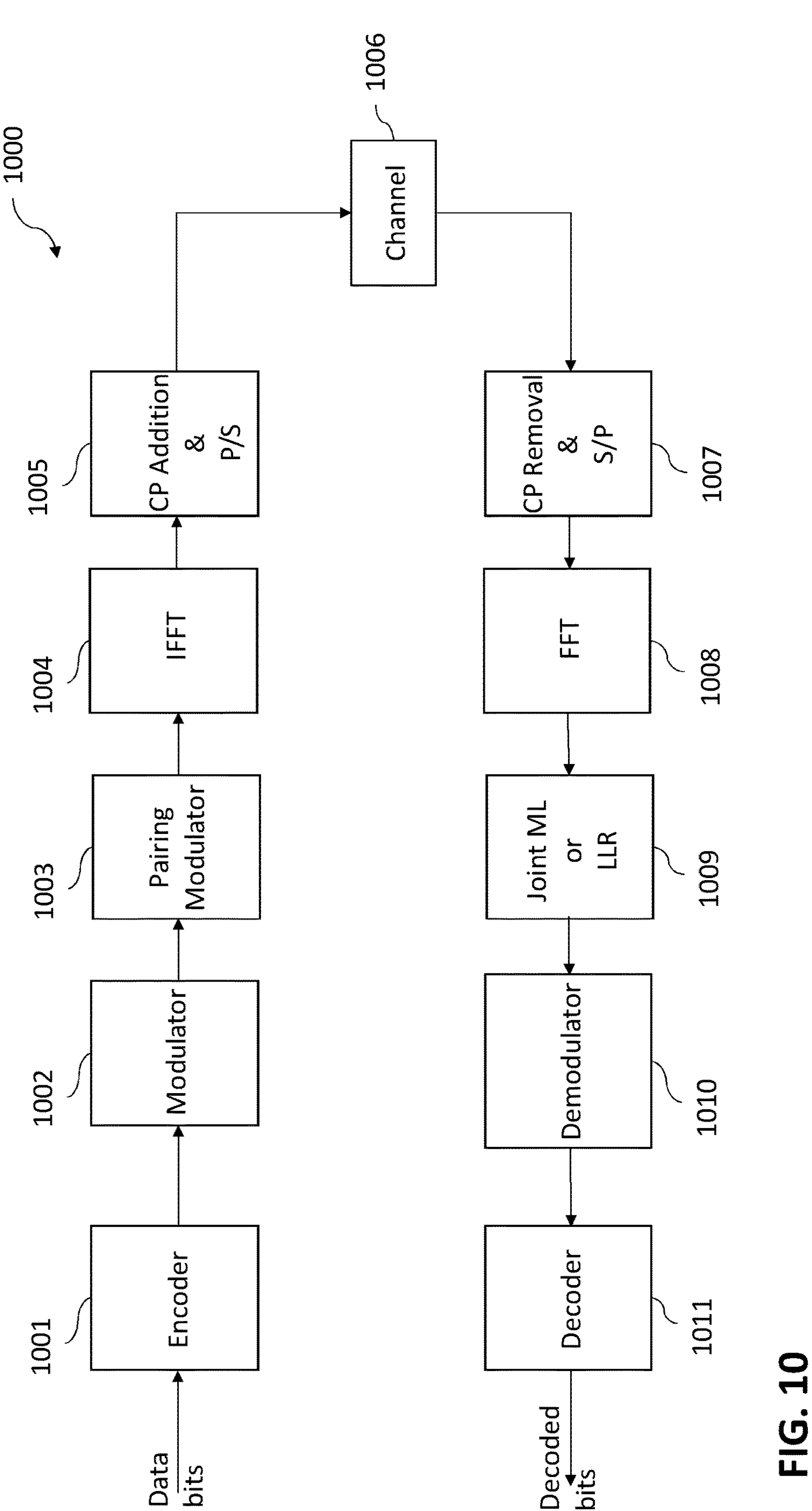
FIG. 10 is a block diagram showing an exemplary chain for transmission and reception connected by a channel, and employing the pairing modulation.

An exemplary implementation of the pairing modulation performed by a transmitter is shown in FIG. 10, in which the transmitter is part of a transmitter-receiver system 1000, applicable in conventional OFDM systems. Such system 1000, may be the communication system CS in FIG. 1. It is noted that FIG. 10 shows both the transmitting and receiving side, with the receiving side being described later below. FIG. 10 is an illustration of structural units, included in the general transmitter Tx and receiver Rx in FIG. 1, and performing their respective functions (e.g. encoding of portions of the incoming data bits by encoder 1001). The same applies to the transmitting device 250 in FIG. 2 and the receiving device 260 in FIG. 2*b*, as well as the transmitter 301 and receiver 305 in FIGS. 3 and 4, respectively.

Figure 3:
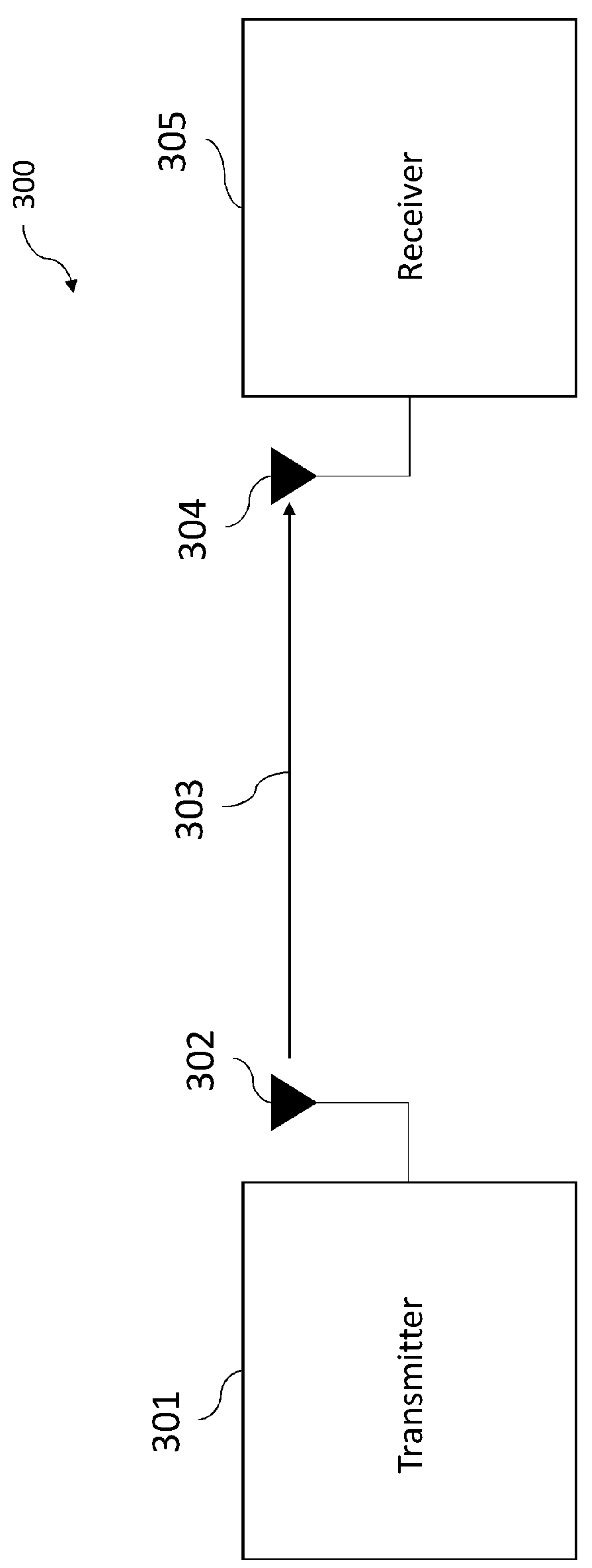
FIG. 3 is a block diagram illustrating an exemplary communication system, including transmitting device and receiving device communicating via a single antenna and employing the pairing modulation.
Figure 4:
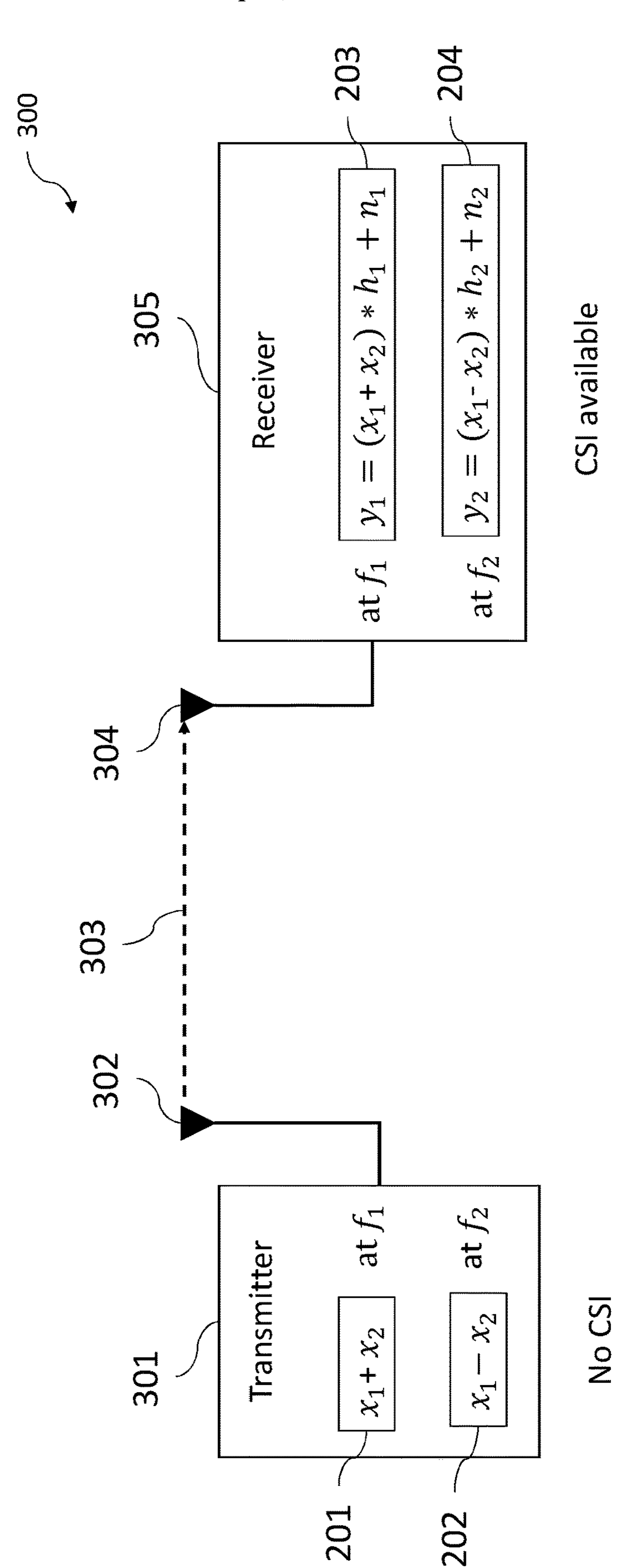
FIG. 4 is a schematic drawing illustrating the pairing of two symbols by the transmitter, and the receiver receiving of two signals, each including two modulation symbols.

The system 1000 includes an encoder 1001, a modulator 1002, a pairing modulator 1003, IFFT process unit 1004, cyclic prefix (CP) addition and parallel-serial (P/S) conversion 1005, which may be included in the transmitting device 250 of FIG. 2*a* or transmitter in FIGS. 3 and 4. Any of the encoder 1001, modulator 1002, pairing modulator 1003, IFFT process unit 1004, cyclic prefix (CP) addition and parallel-serial (P/S) conversion 1005 may be implemented as separate units (functional units and/or structural units), performing functions of encoding, modulation, pairing modulation, IFFT processing, CP adding, and P/S conversion. Alternatively, any of the encoder, modulator, pairing modulator, IFFT, CP addition and P/S may be included in the processing circuitry 252 of the transmission device 250. In case of some of the encoder, modulator, pairing modulator, IFFT, CP addition and P/S being included in the processing circuitry 252, and the remaining ones implemented as separate units, the processing circuitry 252 communicates via the interface 255 with those separate units such that the functions of the encoder, modulator, pairing modulator, IFFT, CP addition and P/S of the transmitter may be performed in the sequence illustrated in FIG. 10 by the upper branch (transmission).

After parallel to serial conversion 1005, the signal is passed to the front end for the transmission. This may include digital to analog conversion and further amplification or signal shaping steps. It is noted that the functional units 1004 and 1005 are only exemplary and the present disclosure is not limited thereto. There may be further modules or the present modules may have further functionalities, such as PAPR reduction or the like. As mentioned above, OFDM is also only an exemplary wireless transmission kind. In general, alternative approached such as NOMA or the like are possible, including non-OFDM waveforms.

The modulator 1002 may use as target modulation QAM modulating the encoded data to provide modulation symbols. The channel 1006 connects wirelessly the transmitting side with the receiving side via a single transmitting and receiving antenna, for example. The single transmitting antenna (not shown in FIG. 10) is part of the transmitter Tx (FIG. 1), transmitting device 250 (FIG. 2*a*), and/or transmitter 301 (antenna 302 in FIGS. 3 and 4). As such, the transmitting antenna provides a link between the hardware-side (i.e., transmitter) and the wireless channel (dielectric media, e.g., air) through which signals are transmitted (e.g., the combined symbols mapped on respective carriers). Instead of a single antenna, the transmitter may have multiple-antennas for transmitting combined symbols. Using a single antenna may be preferred in order to keep the complexity of the transmitter low. Further, the processing of the data bits may be reduced since no complex beam training/forming procedure may be needed before transmitting the combined symbols. Hence, the signaling/processing overhead for transmitting combined symbols is reduced. The single antenna 302 in FIGS. 3 and 4 may be included in the wireless transceiver 253 of FIG. 2*a*. The same applies for multiple antennas. Alternatively, the single antenna or multi-antenna may be a separate entity, connectable to the wireless transceiver 253. The connection may, for example, be implemented by a coaxial cable (COAX) with the wireless transceiver having a corresponding COAX plug-in. The pairing modulator 1003 can be deployed in any communication systems, such as the one of FIG. 1. Firstly, the data bits are input to the transmitter.

To provide a reliable information transfer under destructive channel effects, the data bits (or simply data) are conventionally encoded by the encoder 1001. For encoding, the codes of polar, LDPC, turbo, BCC, etc., can be used. After the encoding, the bits are modulated into symbols (i.e., modulation symbols), for example, with a QAM modulation 1002. Also, a different mapper can be used. Then, the modulated symbols are divided into two groups for pairing modulator 1003, with paring modulator 1003 providing bits of the respective paired symbols.

In some embodiments, the processing circuitry performing the functions described herein may be integrated within an integrated circuit on a single chip. The output of the processing circuitry is the combined signal in time domain. It may be a discrete signal, which the processing circuitry may provide to a transceiver 253 for transmission. The processing circuitry may also implement a control function to control the transceiver 253 to transmit the signal. The transceiver 253 is configured (e.g., by the processing circuitry) to transmit a signal by means of symbols carrying the generated signal (i.e., the combined symbol(s)). For example, the processing circuitry 252 may configure (control) the transceiver 253, over the bus 255, to transmit the signal. The transceiver may be, for example a wireless transceiver.

FIG. 3 shows a simplified system model 300, which includes the communication transmitter 302, a single transmission antenna 302, a channel link 303, and a communication receiver 305 with its single reception antenna 304. The system model 300 of FIG. 3 may be the communication system CS of FIG. 1. The communication transmitter 302 may be the transmitter Tx in FIG. 1 and/or the transmitting device 250 of FIG. 2*a*. In FIG. 3, the interface IF of FIG. 1, may be implemented by the single antenna 302 and the channel link 303 and the receiving antenna 304. The term “device” may be used synonymously for “apparatus”. Likewise, the communication receiver 305 may be the receiver Rx in FIG. 1 and/or the receiving device 260 of FIG. 2*b*, described further below. In the following, communication transmitter/receiver is referred to as transmitter/receiver for brevity without introducing any ambiguity in terms of their functions performed. The same applies to transmitting/receiving device. Also, transmission/reception antenna(s) may be referred to as transmitting/receiving antenna(s) or transmitter/receiver antenna(s).

FIG. 3 illustrates the common processing of the transmitter 301 without pairing modulation: the information bits (data or data bits) are modulated into symbols $x_1$ and $x_2$ (i.e., modulation symbols), which are then mapped onto respective orthogonal carrier frequencies $f_1$ and $f_2$ (sometimes also referred to as sub-carriers). The modulation symbols are transformed into time domain, providing a time-domain signal. The time domain signal passes through RF-front end hardware components, which may perform processing of the time-domain signal including digital-to-analog conversion, gain, amplification etc. The antenna 302 is used to send (transmit) the signal at the transmitter into a wireless channel. Thereby, the modulation symbols $x_1$ and $x_2$ are transmitted independently over the carriers $f_1$ and $f_2$. The channel link 303 changes the transmitted signal until it reaches reception antenna 304. After the reception of the signal with the receiver antenna 304, the communication receiver 305 performs the required analog and digital processes to demodulate and decode the transmitted bits, i.e. the (original) data. As mention above instead of a single transmitting antenna 302 and receiving antenna 304, multi-antennas may be used for transmission and reception, respectively.

FIG. 4 shows transmitter 301, whose functionality is extended by pairing modulation processing. The pairing modulation may be performed by transmitter Tx of FIG. 1 and/or transmitting device 250 of FIG. 2*a*. In an exemplary implementation, the pairing modulation may be provided by processing circuitry 253 of transmitting device 250 in FIG. 2*a*.

The pairing modulation is explained with reference to FIG. 4. For data provided as input to the transmitter 301, the transmitter first generates modulation symbols by mapping sequential portions of the data onto modulation symbols according to a target modulation. It is noted that prior to modulation, the transmitter 301 encodes the portions of the data. In FIG. 4, modulation symbols $x_1$ and $x_2$ refer to a first and second modulation symbol. These modulation symbols can be generated by any modulation techniques, such as QAM, PAM, PSK modulation etc., including their respective subsets. Also, the modulation techniques may be combined. Moreover, the data bits can be coded with any of the coding schemes, such as LDPC before the symbol modulation.

As discussed above for FIG. 3, commonly, what is transmitted via the single antenna 302 are the modulation symbols $x_1$ and $x_2$. On the other hand, instead of sending $x_1$ over $f_1$ and $x_2$ over $f_2$ separately, prior to transmission, a first and second combined symbol are generated, including obtaining a first linear combination of the first and second modulation symbols and obtaining a second linear combination different from the first linear combination of the first and second modulation symbol. For example, the first linear combination is adding the first modulation symbol and the second modulations symbol, and the second linear combination is subtracting the second modulation symbol from the first modulation symbol.

This is illustrated in FIG. 4, with the first combined symbol being $x_1+x_2$ and the second combined symbol being $x_1-x_2$. In this implementation example, the first linear combination obtained is hence $x_1+x_2$ and the second linear combination obtained is $x_1-x_2$, which are different. Before the first and second combined symbols are transmitted, they are both mapped onto a first carrier $f_1$ and a second carrier $f_2$, with $f_1$ and $f_2$ being different (and in some implementations orthogonal). Hence, pairs of symbols $(x_1, x_2)$ are transmitted over the channel 303 as combined symbols $x_1+x_2$ and $x_1-x_2$ over different carriers, with using the same resources compared to conventional systems. This is called “pairing modulation”.

Instead of using orthogonal carrier frequencies (also referred to as carriers or, in general, sub-carriers), orthogonal resources in time, spatial, or a different domain can be used for the combined symbols. When the pairing modulation is applied, the average symbol power increases by two times compared to conventional symbols ($x_1$ and $x_2$ in the above example). Therefore, each of the paired symbols is divided by $\sqrt{2}$ to equalize the averaged power compared the conventional symbols (normalization). For instance, in the example of two symbols $x_1$ and $x_2$ of FIG. 4, the first combined symbol is $$\frac{x_1 + x_2}{\sqrt{2}}$$

and the second combined symbol is $$\frac{x_1 - x_2}{\sqrt{2}}$$

after the normalization, and have the same averaged power as $x_1$ and $x_2$. After these processes, the combined symbols are transmitted through the wireless channel 303 using the respective carriers $f_1$ and $f_2$.

Figure 5:
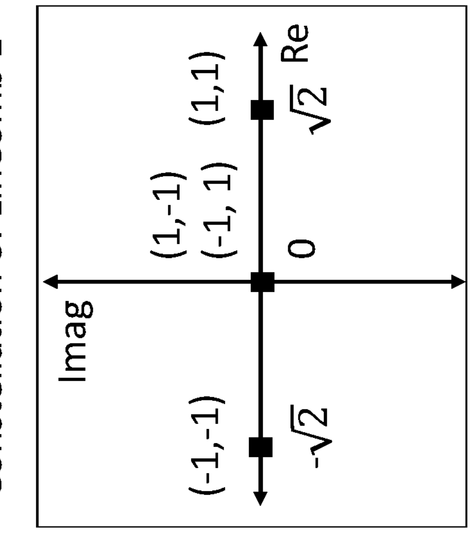
FIG. 5 is a schematic drawing illustrating BPSK constellation used as target modulation for the pairing modulation, resulting in two constellations for the respective linear combinations.
Figure 5:
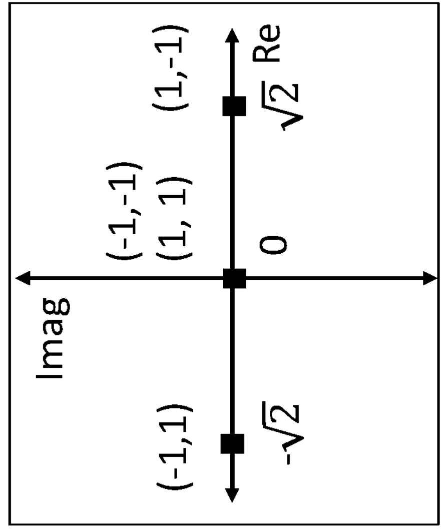
Figure 5:
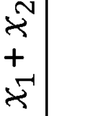
Figure 5:
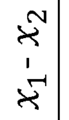
Figure 5:
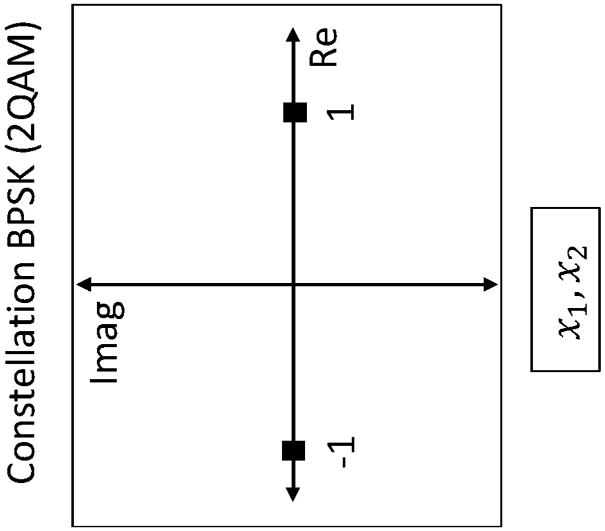
Figure 6:
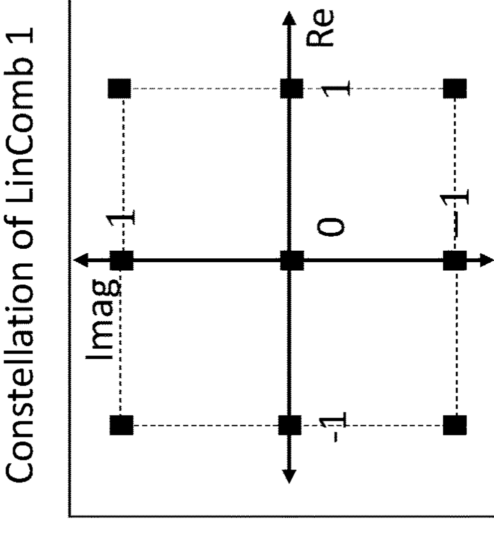
FIG. 6 is a schematic drawing illustrating QPSK constellation used as target modulation for the pairing modulation, resulting in two constellations for the respective linear combinations.
Figure 6:
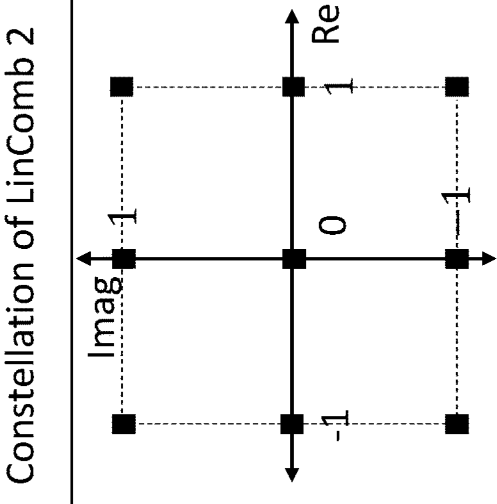
Figure 6:
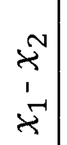
Figure 6:
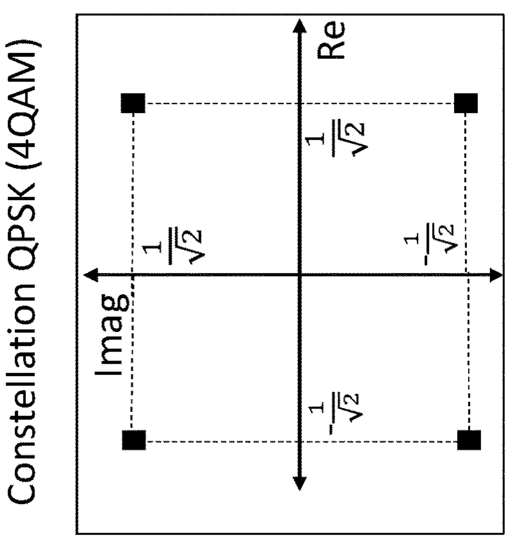
Figure 6:
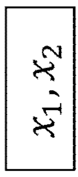

FIGS. 5 and 6 show examples for constellations resulting from the pairing modulation of modulation symbols $x_1$ and $x_2$ for the case of the target modulation being BPSK (FIG. 5) and 4QAM (FIG. 6). For both diagrams shown in FIGS. 5 and 6, the horizontal line refers to the real (Re) axis and vertical line refers to the Imaginary (Imag) axis. On the left of FIG. 5, the constellation for the BPSK modulation is shown, which has two points at (−1,0) and (1,0). In the following, these constellations points are referred to as −1 and 1, respectively. For two modulation symbols $x_1$ and $x_2$, each modulation symbol is independently assigned to values of 1 and −1, as in conventional systems.

This means that there are four possible combinations for pairing the modulation symbols $x_1$ and $x_2$ for one linear combination. As a result, in the pairing modulation case, there is a constellation diagram for each of the two linear combinations, i.e., $x_1+x_2$ and $x_1-x_2$. This is illustrated on the right of FIG. 5 for the case of BPSK. As may be seen in FIG. 5, the constellation diagram for the first linear combination "+" and the second linear combination "−" is the same. Thereby, "same" means that the number and position of the constellation points for both linear combination is the same. However, the combined symbols (i.e. paired symbols) are located at different constellation points.

From this perspective, the pairing modulation is different from multi-mode index modulation (MM-IM) techniques, where different constellation diagrams are considered, and the indexing information is obtained after determining the constellation. However, the pairing modulation uses the same constellation diagram for different carriers, whereas the paired symbols are located differently in the constellation diagrams for the different carriers. For instance, let's assign the symbols as $x_1=-1$ and $x_2=-1$. In this case, one has a $-\sqrt{2}$ symbol on the constellation of $x_1+x_2$ (FIG. 5: top right). On the other hand, one has a 0 symbol on the constellation of $x_1-x_2$ (FIG. 5: bottom right). In short, the (−1,−1) symbol is located on a different constellation point, dependent on the applied linear combination. In the example, a unit power is considered for the constellation diagrams for a fair comparison. Further, different paired symbols such as (1,−1) and (−1,1) are located at the same constellation point (0,0) for the "+" pairing. This means that constellation point (0,0) is two-fold degenerate. Similar applies for symbols (−1,−1) and (1,1) for the "−" pairing.

A similar observation can be made in the example of QPSK (4QAM) shown in FIG. 6. The left shows the four possible constellation points, on which each of the modulation symbols $x_1$ and $x_2$ are mapped, providing 16 possible pairs of combined symbols for each linear combination "+" and respectively. The number of constellation points resulting from each linear combination $x_1+x_2$ and $x_1-x_2$ have nine values of 1+1i, 1, 1−1i, 1i, 0, −1i, −1+1i, −1, −1 −1i. This means that, for each linear combination, multiple different paired symbols have the same position in the respective constellation diagram. For each value of $x_1$ and $x_2$, the corresponding values are selected from these constellation values, but refer to a different symbol on the constellation diagrams of $x_1+x_2$ and $x_1-x_2$. For instance, assume $$x_1 = \frac{1}{\sqrt{2}} + \frac{1}{\sqrt{2}}i \text{ and } x_2 = \frac{1}{\sqrt{2}} - \frac{1}{\sqrt{2}}i,$$

then the paired symbol is 1

$$\left(\left(\frac{1}{\sqrt{2}} + \frac{1}{\sqrt{2}}i + \frac{1}{\sqrt{2}} - \frac{1}{\sqrt{2}}i\right)/\sqrt{2}\right)$$

on the constellation diagram of $x_1+x_2$, and the paired symbol is −1i $$\left(\left(\frac{1}{\sqrt{2}} + \frac{1}{\sqrt{2}}i - \frac{1}{\sqrt{2}} + \frac{1}{\sqrt{2}}i\right)/\sqrt{2}\right)$$

on the constellation diagram of $x_1-x_2$. Like in the BPSK and QPSK modulation examples for the pairing modulation, the constellation diagrams for other modulation orders and types can be formed in a similar manner.

FIG. 7 illustrates the difference between index modulation and pairing modulation. For a proper comparison, the index modulation has two carriers, and it performs indexing and symbol modulation over these carriers. For the look-up table of indexing, if a 0 bit comes, the first carrier is activated, and if a 1 bit comes, the second carrier is activated. A different look-up table can also be designed. Based on this look-up table under BPSK modulation, the symbol pairs of $(-\sqrt{2}, 0)$, $(\sqrt{2}, 0)$, $(0, \sqrt{2})$, and $(0, -\sqrt{2})$ are obtained with respect to (0,0), (0,1), (1,1), and (1,0), where the first bit is for indexing and the second bit is for symbol BPSK modulation. The comparison between the pairing modulation (FIG. 7: left table) and index modulation (FIG. 7: right table) shows that both modulations generate the same symbols on the constellation diagram. However, the coding of the symbols is different.

In particular, the pairing modulation may provide a better performance gain compared to index modulation techniques due to Gray coding property, especially at lower SNR values. To recall, Gray coding minimizes the number of bit errors in that adjacent constellation points differ by a single bit. As a result, the Euclidian distance between the bit codewords (i.e., the bit difference) is increased by more than one bit. As seen from FIG. 7, for a two-bit difference in the bit codewords, the pairing modulation has an Euclidian distance of $$\sqrt{(-\sqrt{2} - \sqrt{2})^2 + (0 - 0)^2}$$

and the index modulation has an Euclidean distance of $$\sqrt{(-\sqrt{2}-0)^2+(0-\sqrt{2})^2}.$$

In turn, for a one bit difference in the bit codewords, the pairing modulation has the Euclidean distance of $$\sqrt{(-\sqrt{2}-0)^2+(0+\sqrt{2})^2}$$

and the index modulation has an Euclidian distance of $$\sqrt{(-\sqrt{2}-\sqrt{2})^2+(0-0)^2},$$

respectively. Hence, in index modulation, the Euclidean distance is higher if the bit difference is less. On the other hand, Gray coding aims to increase the distance, if the bit difference is more. From this perspective, the pairing modulation may be capable of providing a Gray coding as opposed to the index modulation.

The pairing modulation is not limited to the first and second linear combination discussed above, including "+" and "–". Rather, the pairing modulation can be done by a different variant of the way exemplified in FIG. 4. For instance, the pairing modulation can be also done such as $x_1+x_2$ and conjugate($x_1-x_2$). In other words, the generating of the second combined symbol includes taking the complex conjugate of the obtained second linear combination. In a similar way, many different variants of second and/or first linear combinations can be generated. For example, the first combined symbol may be $-x_1-x_2$ and the second combined symbol $-x_1+x_2$.

In order to provide an independent channel effect for the paired symbols, the modulation symbols can be divided into a first group and a second group such that the first group belongs to first half of subcarriers and second group belongs to the second half of subcarriers. The symbols in these groups are paired in order.

According to an embodiment, the processing circuitry 252 is configured to split a plurality, N, of modulation symbols alternately into a first group and a second group; perform said generating a first combined symbol and generating a second combined symbol for each i-th modulation symbol of the first group and i-th modulation symbol of the second group, thereby obtaining N/2 pairs of combined symbols; i being an integer from 1 to N/2. Further, the obtained N/2 pairs of combined symbols are then mapped sequentially onto orthogonal carriers, wherein: the orthogonal carriers are divided into a first half of carriers and a second half of carriers, the first combined symbol of each pair is mapped onto j-th carrier of the first half of carriers and the second combined symbol of each pair is mapped onto j-th carrier of the second half of carriers. Moreover, the first half of carriers have a lower carrier index than any carrier in the second half of carriers. Accordingly, the interference between the combined symbols with the respective same modulation symbols embedded is reduced, and hence reduces corruption of data portions represented by the modulation symbols. Also, the symbol interference is minimized by using carriers whose indices are apart. It is noted that the frequency of a carrier with a low index is lower than the frequency of a carrier with a high index, such as $f_1<f_2$.

Figure 8:
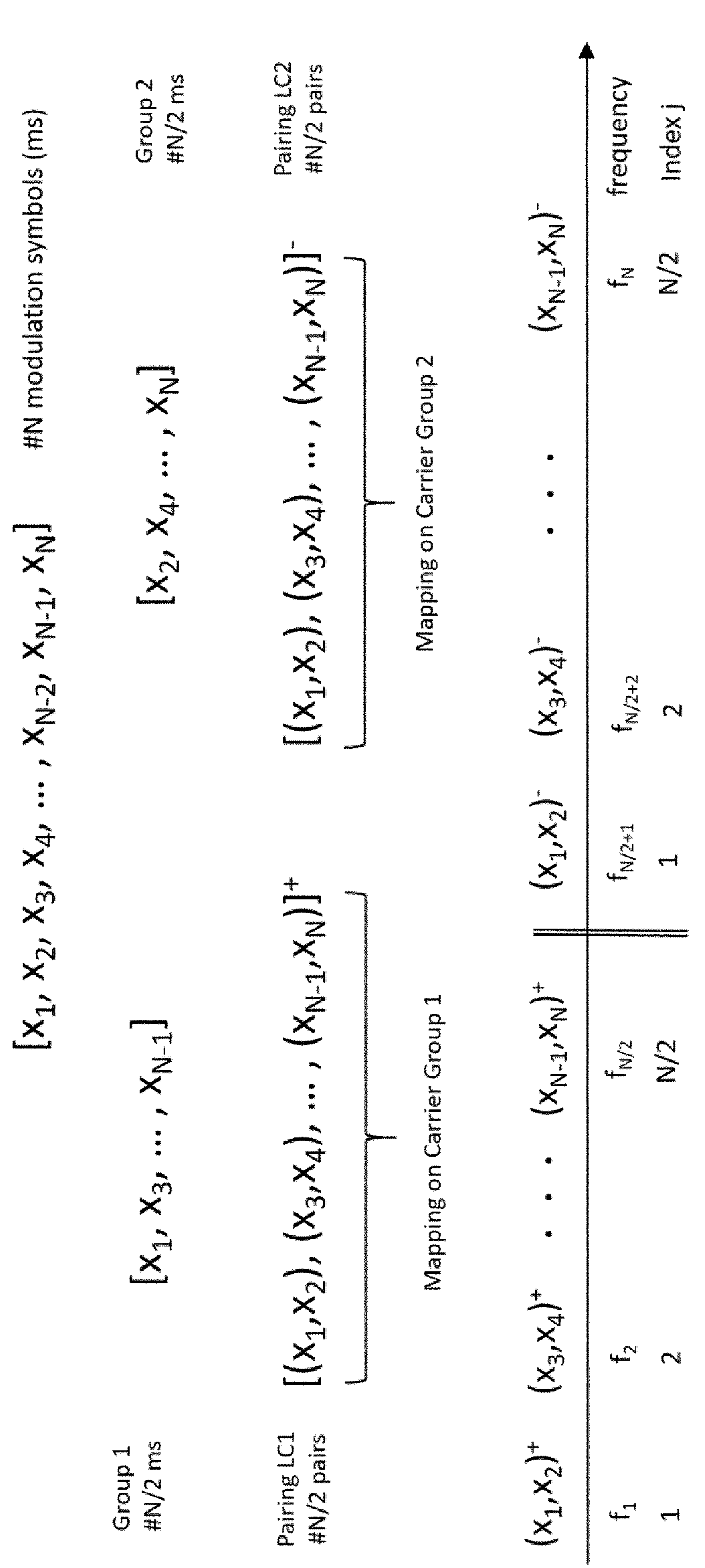
FIG. 8 is a schematic drawing illustrating the pairing modulation, with modulation symbols and carriers divided into groups, and mapping pairs of combination symbols to their respective group.

This is further illustrated in FIG. 8 for a number of N modulation symbols, which are subject to pairing modulation. In the example, the pairing modulation uses two linear combinations (LC) each applied in two modulation symbols. Specifically, in this non-limiting example, in the first linear combination LC1 two modulations symbols are added "+", whereas in the second linear combination LC2 the two modulation symbols are subtracted "–", respectively. Thereby, N may be an even integer equal to or larger than 2. N may be given in powers of 2, i.e., $N=2^p$ with p being an integer larger than 0. In FIG. 8, the modulation symbols are referred to as [x1, x2, . . . xN], which are split into a group 1 and group 2 such that consecutive modulation symbols belong to either group 1 or group 2. In the example shown, modulation symbols x1 and x2 are consecutive symbols, and hence modulation symbol x1 is put into group 1 and modulation symbol x2 is put into group 2. This is repeated for modulations symbols x3 to xN, resulting in group 1 having modulation symbols [x1, x3, . . . , xN–1] and in group 2 having modulation symbols [x2, x4, . . . , xN]. Then, the pairing modulation is applied, with each of LC1 and LC2 being applied to the modulation symbols of group 1, and group 2. In the example shown in FIG. 8, symbol x1 of group 1 and symbol x2 of group 2 are added as result of applying LC1, and symbol x1 of group 1 and symbol x2 of group 2 are subtracted as result of applying LC2. It is noted that FIG. 8 is a mere illustration of the paring modulation for the case where each combined symbol includes two modulation symbols by linearly combining them. Alternatively, more than two modulation symbols may be linearly combined, so as to form one combined symbol.

As FIG. 8 shows, for each pairing "+" and "–", the result is a group of combined symbols of size N/2, and corresponds to N/2 pairs of combined symbols. For example, the combined symbol (x1, x2)+ and (x1, x2)– forms a symbol pair. In total, in the example of FIG. 8, there are N combined symbols, which are to be mapped onto carriers on which the combined symbols are transmitted. In the example, there are N carriers with frequency $f_1$ to $f_N$, with the understanding that the frequency increases with increasing sub-index of the frequency. The N carriers (also referred to a carrier frequencies or simply frequencies) are also divided into a first and second group of carriers, each of size N/2. Thereby, group 1 refers to a first half of carriers $f_1$ to $f_{N/2}$, and group 2 refers to a second half of carriers $f_{N/2+1}$ to $f_N$. Within each carrier group, the respective frequencies may be ordered according to an index j which is a mere label. This means that the same index j labels a carrier frequency within the first and second half, whose frequencies are different. In the example of FIG. 8, the combined symbol (x1, x2)+ is mapped onto frequency $f_1$ which has index 1 within group 1. In turn, combined symbol (x1, x2)– is mapped onto larger frequency $f_{N/2+1}$ which has the same index 1 within group 2. Thereby, the respective frequencies are apart by $f_{N/2+1}-f_1$. This enables that the respective channels through which combined symbols (x1, x2)+ and (x1, x2)– are transmitted are almost decoupled, i.e. the respective channels do not interfere. This, preserves the fidelity of the respective data portion corresponding to the first and second symbols.

Then, the IFFT process 1004 of FIG. 10 is applied to the modulated symbols on the subcarriers, and the CP addition and P/S conversion 1005 are performed for the time domain signal. The transmitted signal is received after passing through the channel 1006, which may be a wireless channel. Still, optionally, the combined symbols may be mapped onto consecutive carriers.

The pairing modulation is not limited by pairing two modulation symbols x1 and x2. Alternatively, more than two symbols may be paired. In other words, the term "pairing modulation" also covers combining more than two modulation symbols. In this case, the respective modulation symbols may be paired by linearly combining them via a sequence of "+" and/or "−" operations. This may be further complemented by taking the conjugate of one or more of the combined symbols.

As to the target modulation, besides those already listed above, a new target modulation may be obtained, for example, by rotating the constellation points representing the modulation symbols.

In the following, the processing on the receiving side is detailed, which may be performed by, for example, receiver Tx in FIG. 1, receiving device 260 in FIG. 2*b*, and receiver 305 in FIGS. 3 and 4. As one exemplary implementation of the receiver, the processing is discussed with respect to the receiving device 260 shown in FIG. 2*b* as one exemplary implementation of the receiver for wireless reception of data.

FIG. 2*b* illustrates a receiving device 260 according to some exemplary embodiments. The receiving device 260 comprises memory 261, processing circuitry 262, and a wireless transceiver 263 (or a wireless receiver 263), which may be capable of communicating with each other via a bus 265. The receiving device 260 may further include a user interface 265. However, for some applications, the user interface 265 is not necessary (for instance some devices for machine-to-machine communications or the like).

The memory 261 may store a plurality of firmware or software modules, which implement some embodiments of the present disclosure. The memory may 261 be read from by the processing circuitry 262. Thereby, the processing circuitry may be configured to carry out the firmware/software implementing the embodiments. The processing circuitry 262 may include one or more processors, which, in operation, determines data.

In some embodiments, the processing circuitry 262 performing the functions described herein may be integrated within an integrated circuit on a single chip. The processing circuitry may also implement a control function to control the transceiver 263 to receive the signal. The transceiver 263 is configured (e.g., by the processing circuitry) to receive a signal and obtain symbols carried therein. For example, the processing circuitry 262 may configure (control) the transceiver 263, over the bus 265, to receive the signal. The transceiver may be, for example, a wireless transceiver obeying some standard or some pre-defined rules in order to comply with the transmitter, e.g. the one described with reference to FIG. 2*a*.

The transceiver/receiver 263 is configured to receive a first combined symbol and a second combined symbol. The processing circuitry 262 may include one or more processors, which, is/are configured to determine the data from the first combined symbol and the second combined symbol, by a predefined detection method. Thereby, it is assumed that sequential portions of the data are mapped onto respective modulation symbols according to a target modulation, with the modulation symbols including a first modulation symbol and a second modulation symbol. It is assumed further that the first combined symbol is generated including obtaining a first linear combination of the first modulation symbol and the second modulation symbol; and the second modulation symbol is generated including obtaining a second linear combination different from the first linear combination of the first modulation symbol and the second modulation symbol. Finally, it is assumed that the first combined symbol is mapped onto a first carrier and the second combined symbol is mapped onto a second carrier, different from the first carrier.

In general, at the receiver, before the above mentioned processing, the signal (i.e., the first and second combined symbols) may be received over a single antenna of the receiver, amplified, and transformed into frequency domain by a transformation such as FFT or DFT (Discrete Fourier Transformation), corresponding to the respective inverse transformation which has been applied at the encoder. After performing fast Fourier transform (FFT), the frequency-domain signals $y_1$ and $y_2$ received at carrier frequencies $f_1$ and $f_2$ (i.e., carries) may be given by;

$$y_1 = h_1 * (x_1 + x_2)/\sqrt{2} + w_1$$

and $$y_2 = h_2 * (x_1 - x_2)/\sqrt{2} + w_2.$$

Here, $h_1$ and $h_2$ denote the channel frequency responses, $w_1$ and $w_2$ are the average weight Gaussian noise (AWGN) contributions for $f_1$ and $f_2$, and $x_1$ and $x_2$ refer to the first modulation symbol and second modulation symbol, respectively. As evident from above equations, both entail the first and second modulation symbol $x_1$ and $x_2$. In an exemplary implementation, in order to detect $x_1$ and $x_2$, a joint demodulation is used as predefined detection method, thereby determining the data, including detecting the first modulation symbol and the second modulation symbol by using the first combined symbol and the second combined symbol.

According to an embodiment, the joint demodulation is maximum likelihood (ML) detection performed according to:

$$[\widehat{x_1}, \widehat{x_2}] = \min_{x_1,x_2}\left(\left\|y_1 - h_1 * (x_1 + x_2)/\sqrt{2}\right\|^2 + \left\|y_2 - h_2 * (x_1 - x_2)/\sqrt{2}\right\|^2\right)$$

Wherein $\widehat{x_1}$ and $\widehat{x_2}$ refer to a first estimate symbol and a second estimate symbol for the first and second modulation symbol, respectively. Since the complexity of the maximum likelihood (ML) detector increases with high order modulation M, the log-likelihood ratio (LLR) detector can be used instead of ML to reduce the computational complexity of the ML detecting process. After the demodulation of the estimated symbols, the transmitted bits (i.e. the respective portions of the data) are obtained.

FIG. 10 illustrates through the bottom branch the structural units as part of an exemplary receiver, compatible with the transmitter described above with reference to FIG. 2*a*. As already discussed, FIG. 10 shows transmitter-receiver system 1000, with the structural units of the receiving side being CP removal and serial-to-parallel (S/P) 1007, FFT 1008, joint ML or LLR 1009, demodulator 1010, and decoder 1011. These structural units may be included in the general receiver Rx in FIG. 1, receiving device 260 of FIG. 2*b*, and receiver 305 in FIGS. 3 and 4, respectively. Any of the receiving-side structural units, including CP removal and S/P conversion 1007, FFT process unit 1008, ML/LLR joint detection 1009, demodulator 1010, and decoder 1011 may be implemented as separate units (i.e. functional units), performing their respective functions of CP removal, S/P conversion, FFT processing, joint detection, demodulation, and decoding. Alternatively, any of the CP removal and S/P conversion, FFT, ML/LLR joint detection, demodulator, and decoder may be included in the processing circuitry 262 of the transmission device 260. In case of some of the CP removal and S/P conversion, FFT, ML/LLR joint detection, demodulator, and decoder being included in the processing circuitry 252, and the remaining ones implemented as separate units, the processing circuitry 262 communicates via the bus 265 with those separate units such that the functions of the CP removal and S/P conversion, FFT, ML/LLR joint detection, demodulator, and decoder of the receiver may be performed in the sequence illustrated in FIG. 10 by the lower branch (receiving).

A signal (e.g. the combined first and second symbols) is received via a single antenna, e.g. antenna 304 in FIG. 3 or FIG. 4, respectively, after passing through channel 1006. The respective signal is a time-domain signal. This is followed by analog-to-digital conversion of the received signal (not shown), providing the received signal in the digital domain. At the receiver, CP removal and S/P conversion 1007 are performed on the digital time-domain signal, followed by the FFT process 1008 to obtain the signals $y_1$ and $y_2$ in the frequency domain. As seen from above equations, $y_1$ and $y_2$ entail the modulation symbols $x_1$ and $x_2$ of interest corresponding to portions of data. In the frequency domain, the joint ML or LLR detector 1009 may be used to detect the modulation symbols from the combined first and second symbols. The joint ML detection has been described above. Also, to decrease the computational complexity and soft decoding, the LLR detector can also be used instead. The detected symbols are converted into bits by the demodulator 1010, which performs said demodulation according to the target modulation. For example, in case of QAM used as the target modulation, the respective demodulation refers to QAM. The demodulation may include de-mapping from the carriers. Then, the bits are decoded so as to obtain the transmitted bits (i.e., the portion of the data) at the receiver. The ML/LLR joint detector 1009 can be deployed in any communication systems, such as the one of FIG. 1.

The single receiving antenna (not shown in FIG. 10) is part of the receiver Rx (FIG. 1), receiving device 260 (FIG. 2*b*), and/or receiver 301 (antenna 305 in FIGS. 3 and 4). As such, the receiving antenna provides a link between the hardware-side (i.e., receiver) and the wireless channel (dielectric media, e.g., air) through which signals are receiver (e.g., the combined symbols). Instead of a single antenna, the receiver may have multiple-antennas for receiving combined symbols. Using a single antenna may be preferred in order to keep the complexity of the receiver low. Further, the processing of the received combined symbols may be reduced, since no complex beam training/forming procedure may be needed before receiving the combined symbols. Hence, the signaling/processing overhead for receiving combined symbols is reduced. The single antenna 305 in FIGS. 3 and 4 may be included in the wireless receiver 263 of FIG. 2*b*. The same applies for multiple antennas. Alternatively, the single antenna or multi-antenna may be a separate entity (i.e. a single or multi-antenna unit), connectable to the wireless receiver 263. The connection may, for example, be implemented by a coaxial cable (COAX) with the wireless receiver having a corresponding COAX plug-in.

Figure 11:
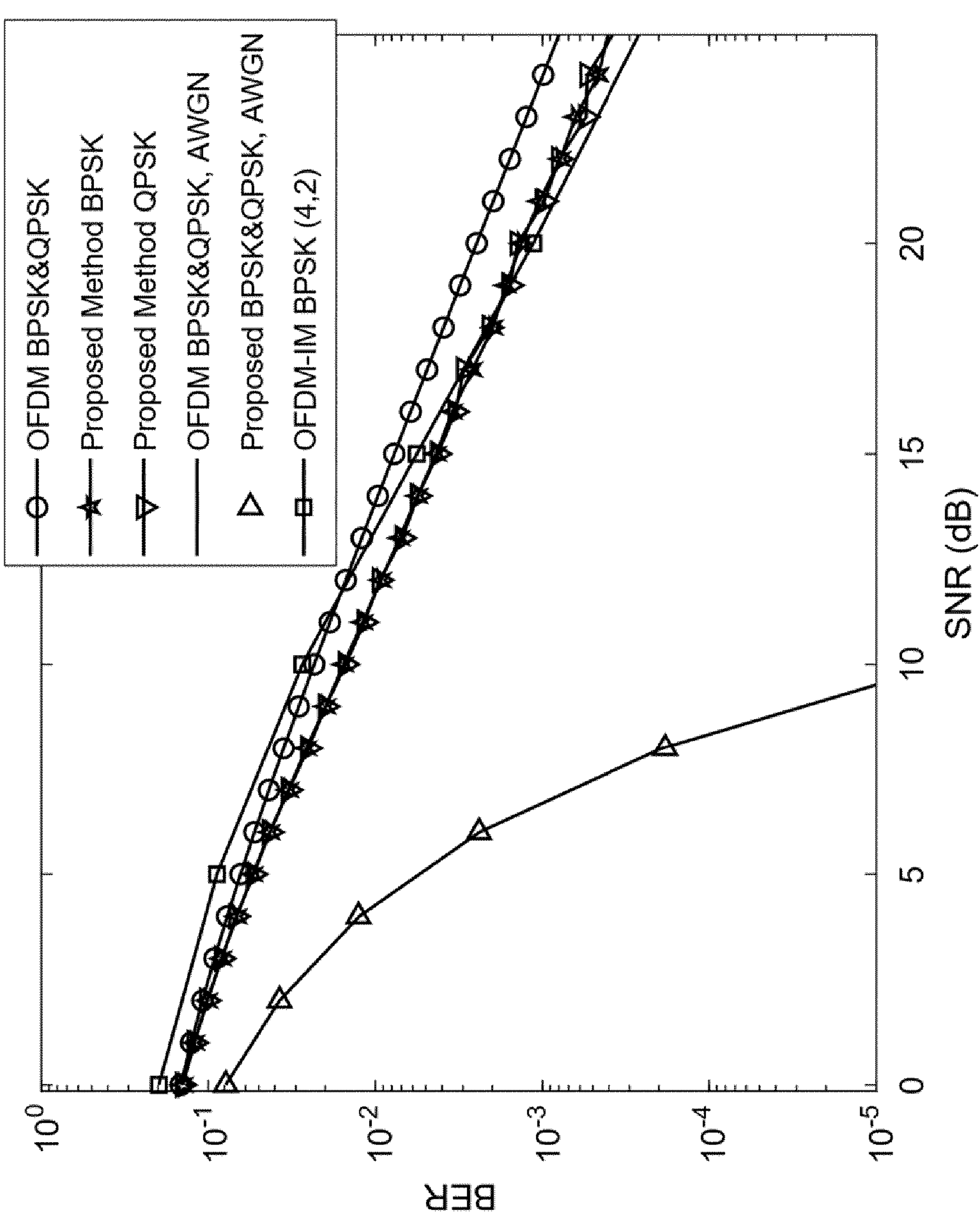
FIG. 11 is a benchmark plot BER versus SNR, comparing the pairing modulation with other modulations.

In order to assess the capabilities regarding spectral efficiency enhancement, FIG. 11 shows a comparison of the pairing modulation of the present disclosure compared to conventional OFDM, and OFDM-IM systems for a frequency selective channel. The presented data have been obtained by simulation, and the comparison uses the bit error rate (BER) as a metric, plotted versus the signal noise ratio (SNR). The pairing modulation with BPSK (see FIG. 5) and QPSK (see FIG. 6) achieves a better BER performance than conventional OFDM systems at low and high SNR values. The gain increases with increasing SNR value. OFDM-IM achieves also a better performance than OFDM systems at high SNR values. The difference between pairing modulation and index modulation is that pairing modulation can achieve a better BER performance than OFDM systems at low SNR values. This is a critical feature, because the selected modulation orders, such as BPSK and QPSK, are used in practice for low SNR values. Moreover, the pairing modulation archives the same performance compared to OFDM systems under the AWGN channel, where OFDM-IM requires a frequency selective channel, but otherwise performs worse than conventional OFDM systems. Here, OFDM-IM uses two active subcarriers out of four subcarriers.

The paring modulation of the present disclosure described above has the following characteristics and/or advantages:

(1) At least two modulated symbols generated by independent and separate information bits are combined differently on two different carriers.

(2) The combined symbol on any carrier is not decodable alone, but joint the demodulation of the two modified symbols on two carriers is possible.

(3) The joint bits of the paired symbols have the Gray coding property. Hence, the combined symbols are more robust against bit errors.

(4) Multiple antennas at transmitter or receiver are not required. It can be deployed for single and multiple antenna systems. Hence, the complexity of the transmitter and/or receiver may be kept low, thereby reducing their fabrication costs as well.

(5) The channel state information at the transmitter is not used for pairing modulation.

Also, the pairing modulation can be performed for more than two symbols, as already mentioned above. In that case, the symbols are combined in a way that, joint demodulation is feasible. For instance, if we have four independent symbols for four different carriers, the special and different modification of four symbols on each carrier will be performed, so that the symbols are separable. This can be achieved, e.g., by orthogonality.

Further advantages of the present disclosure are that it requires a simple operation at the transmitter without any channel state information. The computational complexity for this operation only adds extra two summations. It does not require any look-up table as in index modulation or constellation design as in multi-mode index modulation techniques. The present disclosure provides better spectral efficiency, and hence improves the high-data throughput for a wider SNR interval, while providing Gray coding characteristics. As demonstrated in simulation results in FIG. 11, the present disclosure may outperform conventional OFDM systems, especially at low SNR values. On the other hand, index modulation-based techniques may perform somewhat better at high SNR values. Moreover, index modulation-based techniques may perform worse than OFDM, if the channel is flat or AWGN, but the simulation results for the present disclosure have the same BER performance for the flat fading and AWGN channel. The present disclosure does not require any complex modifications for the integration into any communication systems. It can be easily integrated into existing and future wireless communication systems, such as 5G/6G technologies etc.

Figure 9B:
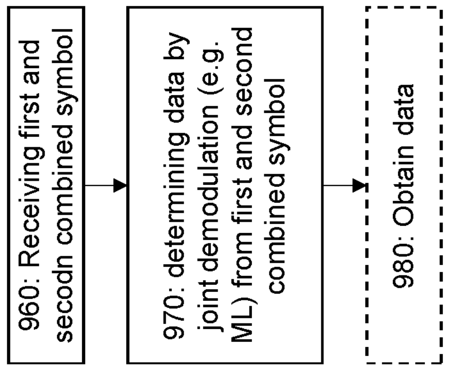
FIG. 9*b* is a flow diagram illustrating exemplary steps performed by a receiving device employing the pairing modulation.
Figure 9A:
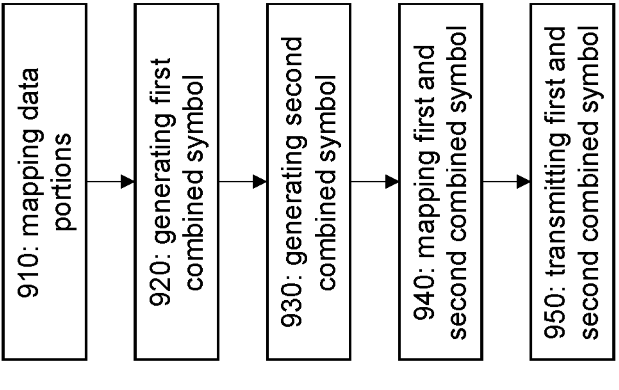
FIG. 9*a* is a flow diagram illustrating exemplary steps performed by a transmitting device employing the pairing modulation.

In correspondence with the above described transmitting device and receiving device, communication methods for wireless transmission(s) to be performed by a transmitting device and a receiving device is provided. As illustrated in FIG. 9*a*, the transmitting method for wireless transmission of data comprises mapping 910 of sequential portions of the data onto respective modulation symbols according to a target modulation. The modulation symbols include a first modulation symbol and a second modulation symbol. The data are a bit sequence, which are sequentially mapped onto first and second modulation symbols (i.e., symbols are not repeated). Hence, the data may be represented as modulation symbols according to a target modulation. Said target modulation is PSK, BPSK corresponding to a modulation with order 2 or is QAM corresponding to a modulation order of 4. The order of modulation may be higher (e.g., nPSK modulations or nQAM modulations). In general, modulation symbols are complex symbols.

The method may further include generating 920 a first combined symbol including obtaining a first linear combination of the first modulation symbol and the second modulation symbol, and generating 930 a second combined symbol including obtaining a second linear combination of the first modulation symbol and the second modulation symbol. Thereby, the second linear combination is different from the first linear combination. The first linear combination may be adding the first and second modulation symbol, and the second linear combination may be subtracting the second modulation symbol from the first modulation symbol. The generating of the second combined symbol may be complemented by taking the complex conjugate of the obtained second linear combination.

The method may further include mapping 940 the first combined symbol onto a first carrier and the second combined symbol onto a second carrier, different from the first carrier. The mapping may include further steps, including splitting of, for example, N modulation symbols into a first and second group. The first and second symbols are then generated for each of the i-th modulation symbol of the first group and the i-th modulation symbol of the second group. This provides N/2 pairs of combined symbols. The obtained N/2 pairs of combined symbols are then mapped onto orthogonal carriers, which are divided into a first half and a second half. For each pair of combined symbols, the first combined symbol is mapped onto the j-th carrier of the first half, and the second combined symbol is mapped onto the j-th carrier of the second half. Also, the first half of carriers have a lower carrier index than any carrier in the second half of carriers.

Finally, the first and second combined symbols are transmitted 950. The transmission here may include various different steps. For example, after the mapping onto the carriers, an IFFT may be employed to generate frequency division multiplex symbols (such as OFDM symbols or symbols generated in a non-orthogonal frequency division scheme, or the like. Any system which maps modulation symbols onto different carriers may be applied. Peak-to-average power ratio (PAPR) reducing techniques may be applied, cyclic prefix (CP) may be included between the symbols, beamforming or space-time block coding or other form or spatial diversity may be added by any of the known techniques. Moreover, waveforming and amplification may be applied. These steps are only exemplary, there may be additional steps and not all of the above-mentioned steps need to be applied (such as PAPR reduction), as is clear to those skilled in the art.

In correspondence with the above-described receiving device, a communication method for wireless reception to be performed by a receiving device is provided. As illustrated in FIG. 9*b*, the method comprises receiving 960 a first combined symbol and a second combined symbol. Then the data may be determined 970 using a predefined detection method. The predefined detection method may be joint demodulation to detect the first and second modulation symbol from the first and second combined symbols. It is noted that single-symbol detectors are not so suitable. The joint demodulation may include a maximum likelihood detection. As evident from above description, each combined symbol has been received on a respective carrier. Thereby, it is assumed that sequential portions of the data are mapped onto respective modulation symbols according to a target modulation, with the modulation symbols including a first modulation symbol and a second modulation symbol. It is further assumed that the first combined symbol is generated including obtaining a first linear combination of the first modulation symbol and the second modulation symbol, and the second modulation symbol is generated including obtaining a second linear combination different from the first linear combination of the first modulation symbol and the second modulation symbol. Finally it is assumed that the first combined symbol is mapped onto a first carrier and the second combined symbol is mapped onto a second carrier, different from the first carrier. The data are finally obtained 980, i.e. the respective data bits are obtained from demapping of the detected first and second modulation symbols, representing sequential portions of the data.

Some embodiments of the present disclosure may be used in conjunction with various devices and systems, for example, a wireless communication station (STA), a wireless communication device, a wireless access point (AP), a modem, a wireless modem, a personal computer (PC), a desktop computer, a mobile computer, a laptop computer, a notebook computer, a tablet computer, a server computer, a set-top box, a handheld computer, a handheld device, a personal digital assistant (PDA) device, a handheld PDA device, a mobile STA (MS), a graphics display, a communication STA, a network, a wireless network, a local area network (LAN), a wireless LAN (WLAN), a metropolitan area network (MAN), a wireless MAN (WMAN), a wide area network (WAN), a wireless WAN (WWAN), devices and/or networks operating in accordance with existing IEEE 802.11, 802.11a, 802.11b, 802.11e, 802.11g, 802.11h, 802.11i, 802.11n, 802.11ac, 802.11 ad, 802.16, 802.16d, 802.16e standards and/or future versions and/or derivatives and/or long term evolution (LTE) of the above standards, a personal area network (PAN), a Piconet, a wireless PAN (WPAN), units and/or devices which are part of the above WLAN and/or PAN and/or WPAN networks, one-way and/or two-way radio communication systems, cellular radiotelephone communication systems, a cellular telephone, a wireless telephone, a personal communication systems (PCS) device, a PDA device which incorporates a wireless communication device. Embodiments of the present disclosure may also be used in various other apparatuses, devices, systems, and/or networks.

The present disclosure of symbol modulation in communication systems by pairing modulation described above requires a simple operation at the transmitter without any channel state information. The computational complexity for this operation only adds extra two summations for the case of pairing two modulation symbols via the first linear combination "+" and the second linear combination "−". Moreover, it does not require any look-up table as otherwise needed in index modulation or constellation design as in multi-mode index modulation techniques. The above-described methods may provide a better spectral efficiency and a better performance for a wider SNR interval, since it provides a Gray coding for the joint modulation of two symbols, as discussed above. For the Gray coding, the present disclosure can modulate the paired symbol in a specific way, e.g. by multiplying the modulation symbols by 1 or −1. Moreover, it performs better than conventional systems for low SNR values. Also, the present disclosure provides the same error performance as conventional techniques for flat fading and AWGN channels. As a result, the present disclosure outperforms conventional OFDM systems at low and high SNR values. On the other hand, index modulation-based techniques outperform at high SNR values. Moreover, index modulation-based techniques perform worse than OFDM if the channel is flat or AWGN, but the present disclosure has the same BER performance for the flat fading and AWGN channel.

Over and above, the present disclosure does not require any complex modifications for the integration into any communication systems. Rather, it can be easily integrated into existing and future wireless communication systems.

The methodologies described herein (at the transmitter side and the received side) may be implemented by various means depending upon the application. For example, these methodologies may be implemented in hardware, operation system, firmware, software, or any combination of two or all of them. For a hardware implementation, any processing circuitry may be used, which may include one or more processors. For example, the hardware may include one or more of application specific integrated circuits (ASICs), digital signal processors (DSPs), digital signal processing devices (DSPDs), programmable logic devices (PLDs), field programmable gate arrays (FPGAs), processors, controllers, any electronic devices, or other electronic circuitry units or elements designed to perform the functions described above.

If implemented as program code, the functions performed by the transmitting apparatus (device) may be stored as one or more instructions or code on a non-transitory computer readable storage medium such as the memory 310 or any other type of storage. The computer-readable media includes physical computer storage media, which may be any available medium that can be accessed by the computer, or, in general by the processing circuitry 320. Such computer-readable media may comprise RAM, ROM, EEPROM, optical disk storage, magnetic disk storage, semiconductor storage, or other storage devices. Some particular and non-limiting examples include compact disc (CD), CD-ROM, laser disc, optical disc, digital versatile disc (DVD), Blu-ray (BD) disc or the like. Combinations of different storage media are also possible—in other words, distributed and heterogeneous storage may be employed.

For example, the program code may cause the processing circuitry 252 and/or processing circuitry 262 (e.g. including one or more processors) to operate as a special purpose computer programmed to perform the techniques disclosed herein. The program code is stored on a non-transitory and computer readable medium, such as the memory 251 and/or memory 261. In particular, storing program code for transmitting data as described herein may be stored on memory 251, while program code for receiving data as described herein may be stored on memory 261. Alternatively, program code for transmitting and receiving data may be stored on memory 251 and/or memory 261, respectively.

The embodiments and exemplary implementations mentioned above show some non-limiting examples. It is understood that various modifications may be made without departing from the disclosed subject matter. For example, modifications may be made to adapt the examples to new systems and scenarios without departing from the central concept described herein. In particular, the above embodiments and exemplary implementations are multiple-input multiple-output (MIMO) compatible and can be applied to all MCSs.

According to an aspect, a method is provided for wireless transmission of data, the method comprising: mapping sequential portions of the data onto respective modulation symbols according to a target modulation, the modulation symbols including a first modulation symbol and a second modulation symbol; generating a first combined symbol including obtaining a first linear combination of the first modulation symbol and the second modulation symbol; generating a second combined symbol including obtaining a second linear combination different from the first linear combination of the first modulation symbol and the second modulation symbol; and mapping the first combined symbol onto a first carrier and the second combined symbol onto a second carrier, different from the first carrier; and transmitting the first combined symbol and the second combined symbol.

In an exemplary implementation, the first linear combination is adding the first modulation symbol and the second modulation symbol; and the second linear combination is subtracting the second modulation symbol from the first modulation symbol. Further, the generating of the second combined symbol includes taking the complex conjugate of the obtained second linear combination.

Moreover, the first combined symbol and the second combined symbols is performed using a single antenna. Accordingly, the complexity of the transmitter may be reduced as opposed to a multi-antenna transmitter, and hence keeping fabrication costs low. Alternatively, the first and second combined symbol may be transmitted using multiple antennas as relevant for MIMO systems, for example. The transmitting of the first and second combined symbols includes orthogonal frequency division multiplex, OFDM, modulation of the carriers including carriers carrying the first combined symbol and the second combined symbol. Accordingly, the combined symbols can be transmitted over compressed frequency resources employing OFDM waveforms. In some exemplary implementations, the target modulation is one of phase shift keying, PSK, pulse amplitude modulation, PAM, and quadrature amplitude modulation, QAM. Hence, a variety of target modulations may be used to generate the modulation symbols, used for the combined symbol generation.

According to an embodiment, the method comprises further splitting a plurality, N, of modulation symbols alternately into a first group and a second group; performing said generating a first combined symbol and generating a second combined symbol for each i-th modulation symbol of the first group and i-ith modulation symbol of the second group, thereby obtaining N/2 pairs of combined symbols; i being an integer from 1 to N/2; mapping the obtained N/2 pairs of combined symbols sequentially onto orthogonal carriers, wherein: the orthogonal carriers are divided into a first half of carriers and a second half of carriers, and the first combined symbol of each pair is mapped onto j-th carrier of the first half of carriers and the second combined symbol of each pair is mapped onto j-th carrier of the second half of carriers. For example, N may be an integer equal to or larger than 4. In one implementation, N may be given in powers of two such as $N=2^p$ with p being an integer larger than 1.

Moreover, the first half of carriers have a lower carrier index than any carrier in the second half of carriers. This may provide an advantage of reducing the interference between combined symbols, and hence improves the reception quality of data.

According to an aspect, a method is provided for wireless reception of data, the method comprising: receiving a first combined symbol and a second combined symbol; and determining the data from the first combined symbol and the second combined symbol, by a predefined detection method assuming that: sequential portions of the data are mapped onto respective modulation symbols according to a target modulation, the modulation symbols including a first modulation symbol and a second modulation symbol; the first combined symbol is generated including obtaining a first linear combination of the first modulation symbol and the second modulation symbol; the second modulation symbol is generated including obtaining a second linear combination different from the first linear combination of the first modulation symbol and the second modulation symbol; and the first combined symbol is mapped onto a first carrier and the second combined symbol is mapped onto a second carrier, different from the first carrier. In an exemplary implementation, the predefined detection method includes joint demodulation, and the determining of the data includes detecting the first modulation symbol and the second modulation symbol by using the first combined symbol and the second combined symbol. Accordingly, the first and second modulation symbols may be determined together in a single operation, thereby improving the efficiency of determining the data.

For example, the joint demodulation is maximum likelihood detection performed according to:

$$[\hat{x_1}, \hat{x_2}] = \min_{x_1,x_2}\left(\left\|y_1 - h_1 * (x_1 + x_2)/\sqrt{2}\right\|^2 + \left\|y_2 - h_2 * (x_1 - x_2)/\sqrt{2}\right\|^2\right)$$

wherein $h_1$ and $h_2$ refer to the channel frequency response at carrier $f_1$ and $f_2$, $x_1$ an $x_2$ refer to the first modulation symbol and second modulation symbol, $y_1$ and $y_2$ refer to a first received signal and a second received signal, and $\hat{x_1}$ and $\hat{x_2}$ refer to a first estimate symbol and a second estimate symbol for the first and second modulation symbol, respectively.

The above-described modulation details also apply to the receiving method, as the receiving method processes the signal as transmitted by the transmitter.

According to an aspect, an apparatus is provided for wireless transmission of data, comprising: a circuitry configured to: map sequential portions of the data onto respective modulation symbols according to a target modulation, the modulation symbols including a first modulation symbol and a second modulation symbol; generate a first combined symbol including obtaining a first linear combination of the first modulation symbol and the second modulation symbol; generate a second combined symbol including obtaining a second linear combination different from the first linear combination of the first modulation symbol and the second modulation symbol; map the first combined symbol onto a first carrier and the second combined symbol onto a second carrier, different from the first carrier; and a transceiver configured to transmit the first combined symbol and the second combined symbol.

According to an aspect, an apparatus is provided for wireless reception of data, comprising: a transceiver configured to receive a first combined symbol and a second combined symbol; and a circuitry configured to determine the data from the first combined symbol and the second combined symbol, by a predefined detection method assuming that: sequential portions of the data are mapped onto respective modulation symbols according to a target modulation, the modulation symbols including a first modulation symbol and a second modulation symbol; the first combined symbol is generated including obtaining a first linear combination of the first modulation symbol and the second modulation symbol; the second modulation symbol is generated including obtaining a second linear combination different from the first linear combination of the first modulation symbol and the second modulation symbol; and the first combined symbol is mapped onto a first carrier and the second combined symbol is mapped onto a second carrier, different from the first carrier.

The examples and exemplary implementations described above for the methods apply in the same manner to the apparatuses. in particular, the processing circuitry may be further configured to perform the steps of one or more of the above-described embodiments and exemplary implementations.

Still further, a computer program is provided, stored on a non-transitory and computer-readable medium, wherein the computer program includes instructions which when executed on one or more processors or by a processing circuitry perform steps of any of the above-mentioned methods.

According to some embodiments, the processing circuitry and/or the transceiver is embedded in an integrated circuit, IC.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the disclosed subject matter. For example, it is to be understood that the presently disclosed subject matter contemplates that, to the extent possible, one or more features of any embodiment can be combined with one or more features of any other embodiment.

The disclosed subject matter can be used in any communication system, such as 4G, 5G, and Wi-Fi. Due to the high spectral efficiency of the disclosed subject matter for low modulation orders such as BPSK and QPSK, it has potential to be used for IoT communication systems.

The invention claimed is:

1. A method for wireless transmission of data, the method comprising:

mapping sequential portions of data onto respective modulation symbols according to a target modulation, wherein the modulation symbols belong to a same constellation of the target modulation and comprise a first modulation symbol and a second modulation symbol;

generating a first combined symbol comprising obtaining a first linear combination of the first modulation symbol and the second modulation symbol;

generating a second combined symbol comprising obtaining a second linear combination different from the first linear combination of the first modulation symbol and the second modulation symbol;

mapping the first combined symbol onto a first carrier and the second combined symbol onto a second carrier, different from the first carrier; and transmitting the first combined symbol and the second combined symbol.

2. The method according to claim 1, wherein:

the first linear combination is adding the first modulation symbol and the second modulation symbol; and the second linear combination is subtracting the second modulation symbol from the first modulation symbol.

3. The method according to claim 2, wherein the generating of the second combined symbol comprises taking a complex conjugate of the obtained second linear combination.

4. The method according to claim 2, further comprising:

splitting a plurality (N) of modulation symbols alternately into a first group and a second group;

performing said generating a first combined symbol and generating a second combined symbol for each i-th modulation symbol of the first group and i-th modulation symbol of the second group, thereby obtaining N/2 pairs of combined symbols; i being an integer from 1 to N/2;

mapping the obtained N/2 pairs of combined symbols sequentially onto orthogonal carriers, wherein:

the orthogonal carriers are divided into a first half of carriers and a second half of carriers, and the first combined symbol of each pair is mapped onto j-th carrier of the first half of carriers and the second combined symbol of each pair is mapped onto j-th carrier of the second half of carriers.

5. The method according to claim 4, wherein the first half of carriers have a lower carrier index than any carrier in the second half of carriers.

6. The method according to claim 1, wherein the transmitting of the first combined symbol and the second combined symbols is performed using a single antenna.

7. The method according to claim 1, wherein the target modulation is one of phase shift keying (PSK), pulse amplitude modulation (PAM), or quadrature amplitude modulation (QAM).

8. The method according to claim 1, wherein the transmitting comprises orthogonal frequency division multiplex (OFDM) modulation of the carriers comprising carriers carrying the first combined symbol and the second combined symbol.

9. A method for wireless reception of data, the method comprising:

receiving a first combined symbol and a second combined symbol; and determining data from the first combined symbol and the second combined symbol, by a predefined detection method assuming that:

sequential portions of the data are mapped onto respective modulation symbols according to a target modulation, wherein the modulation symbols belong to a same constellation of the target modulation and comprise a first modulation symbol and a second modulation symbol;

the first combined symbol is generated comprising obtaining a first linear combination of the first modulation symbol and the second modulation symbol;

the second modulation symbol is generated comprising obtaining a second linear combination different from the first linear combination of the first modulation symbol and the second modulation symbol; and the first combined symbol is mapped onto a first carrier and the second combined symbol is mapped onto a second carrier, different from the first carrier.

10. The method according to claim 9, wherein:

the predefined detection method comprises joint demodulation, and the determining of the data comprises detecting the first modulation symbol and the second modulation symbol by using the first combined symbol and the second combined symbol.

11. The method according to claim 10, wherein the joint demodulation is maximum likelihood detection performed according to:

$$[\widehat{x_1}, \widehat{x_2}] = \min_{x_1, x_2}\left(\left\|y_1 - h_1 * (x_1 + x_2)/\sqrt{2}\right\|^2 + \left\|y_2 - h_2 * (x_1 - x_2)/\sqrt{2}\right\|^2\right)$$

wherein $h_1$ and $h_2$ refer to a channel frequency response at carrier $f_1$ and $f_2$, $x_1$ and $x_2$ refer to the first modulation symbol and the second modulation symbol, $y_1$ and $y_2$ refer to a first received signal and a second received signal, and $\widehat{x_1}$ and $\widehat{x_2}$ refer to a first estimate symbol and a second estimate symbol for the first modulation symbol and the second modulation symbol, respectively.

12. A computer program product comprising a non-transitory computer readable medium comprising instructions which, when executed on one or more processors, cause the one or more processors to perform the method of claim 1.

13. An apparatus for wireless transmission of data, comprising:

circuitry configured to:

map sequential portions of data onto respective modulation symbols according to a target modulation, wherein the modulation symbols belong to a same constellation of the target modulation and comprise a first modulation symbol and a second modulation symbol;

generate a first combined symbol comprising obtaining a first linear combination of the first modulation symbol and the second modulation symbol;

generate a second combined symbol comprising obtaining a second linear combination different from the first linear combination of the first modulation symbol and the second modulation symbol; and map the first combined symbol onto a first carrier and the second combined symbol onto a second carrier, different from the first carrier; and a transceiver configured to transmit the first combined symbol and the second combined symbol.

14. An apparatus for wireless reception of data, comprising:

a transceiver configured to receive a first combined symbol and a second combined symbol; and circuitry configured to determine data from the first combined symbol and the second combined symbol, by a predefined detection method assuming that:

sequential portions of the data are mapped onto respective modulation symbols according to a target modulation, wherein the modulation symbols belong to a same constellation of the target modulation and comprise a first modulation symbol and a second modulation symbol;

the first combined symbol is generated comprising obtaining a first linear combination of the first modulation symbol and the second modulation symbol;

the second modulation symbol is generated comprising obtaining a second linear combination different from the first linear combination of the first modulation symbol and the second modulation symbol; and the first combined symbol is mapped onto a first carrier and the second combined symbol is mapped onto a second carrier, different from the first carrier.

* * * * *